United States Patent Office 3,451,643
Patented June 24, 1969

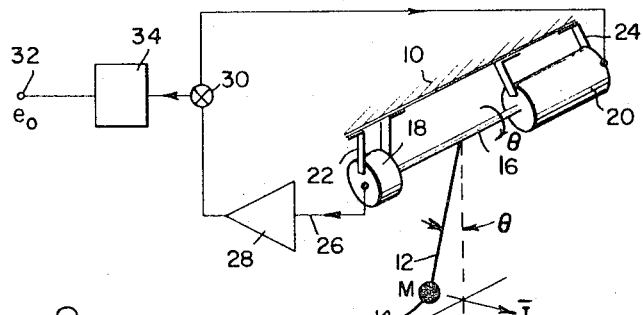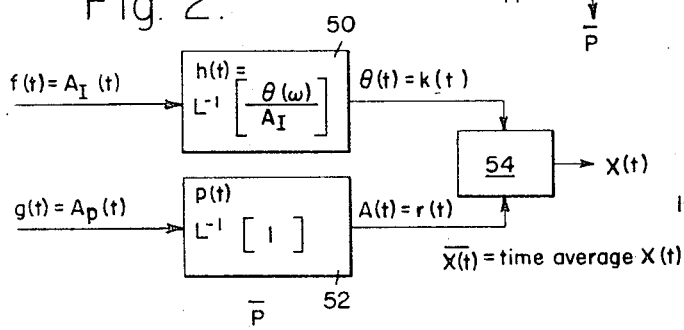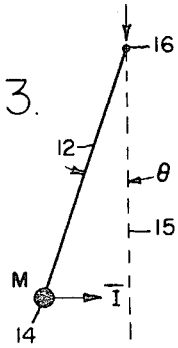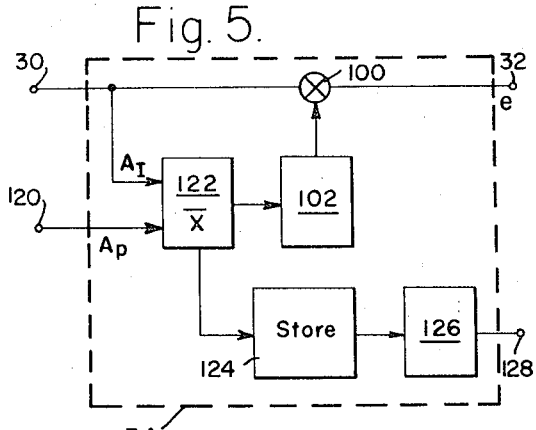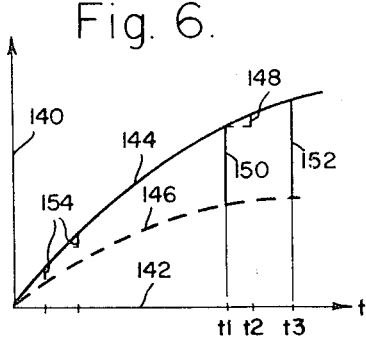
David Sargent,
Richard C. Rountree,
INVENTORS.
BY.
ATTORNEY.

3,451,643
STRAPDOWN GUIDANCE SYSTEM
David Sargent, Redondo Beach, and Richard C. Rountree, Long Beach, Calif., assignors to TRW Inc., Redondo Beach, Calif., a corporation of Ohio
Filed Oct. 18, 1966, Ser. No. 587,617
Int. Cl. F42b 15/02; G06f 15/50
U.S. Cl. 244—3.2                                18 Claims

ABSTRACT OF THE DISCLOSURE

Method and preferred system for compensating out substantially all the rectification error in strapdown guidance systems of missiles and other vehicles by deriving electrical signal correction functions from prior flight test data of identical vehicles, and regenerating those correction functions electrical signals, for insertion in the strapdown system and associated networks as the vehicle mission proceeds.

---

This invention relates to strapdown guidance and in particular to a new system and method for improving the accuracy of strapdown navigation systems.

The term "strapdown guidance" refers to the mounting of inertial sensors, gyros and accelerometers, directly on the structure of a spacecraft, airplane, or other vehicle, rather than on a stable platform. Strapdown guidance gyros, accelerometers, and other instruments are thus subjected to the same vibrations as the main air frame structure, with the result that they must perform in the severe environment of random vibration and shock caused by space vehicle lift-off, orbital adjustments and descent, or aircraft takeoff, flight, and landing.

Typically, the only moving elements in a strapdown navigation system are those within three gyroscopes and three accelerometers. There are no gimbals or floated spheres as in other inertial guidance systems. Such simplifications in the electro-mechanical design result in a significant reduction in the cost, weight, space occupied, and power consumed by a strapdown navigation system. In addition, the simplicity of a strapdown guidance system makes it both less likely to malfunction and more easily repaired. The price paid for this simplicity is that a strapdown guidance system must cope with vibration-induced errors in instrument measurements.

One variety of "error" that occurs in strapdown guidance is Rectification Error (abbreviated hereafter—R.E.) a name which covers a variety of environmental induced phenomena, including such well-known phenomena as coning, sculling, and accelerometer vibropendulous bias. R.E. is so named because it defines a class of errors that arise due to the multiplication of two vibration inputs in a strapdown guidance servo system to give a non-zero average product. R.E. is therefore a kinematic error, one inherent even in a frictionless system and not curable merely by refining the performance of strapdown guidance components or by defining the input vibrations to have mean values of zero.

The vibrations in a strapdown guidance system that cause R.E. may be either translational or rotational or both. Two of these vibrations may be defined as random functions $f(t)$ and $g(t)$. The servo loops involved, referred to by their time domain impulse response functions $h(t)$ and $p(t)$, then make responses $k(t)$ to $f(t)$ and $r(t)$ to $g(t)$. The instantaneous multiplication of the responses $k(t)$ and $r(t)$ is then denoted $x(t)$, the rectification error. The average value of $x(t)$ will be denoted $\bar{x}(t)$, the mean value of the rectification error.

Present strapdown guidance systems merely "live with" R.E., treating R.E.-induced inaccuracy of navigation as inherent in the system. Typically, calculations are made which attempt to predict the amount of R.E. that the system will experience; but such calculations are lacking in methematical rigor and no attempts at compensating R.E. are made.

The main object of this invention is to eliminate the effects of R.E. from strapdown guidance systems, where the exact instantaneous values of $f(t)$ and $g(t)$, the vibrations causing R.E., are not known. In such cases it is not possible even to predict such values, i.e., $f(t)$ and $g(t)$ are nondeterministic and only certain statistical parameters may be known.

In the achievement of the above and other objects and as a broad principle of this invention there is provided a system for, and a method of, compensation of strapdown systems against the ultimate effect of R.E., which is target miss or other navigation inaccuracies. One feature of the invention is the addition of a compensation network to the servo loops or other networks with which the strapdown guidance sensors are associated. Also included in some species of the invention are data storage means and function generators which will serve to add to the gyro output signal compensation functions for eliminating the effects of R.E.

Other features of the invention are several methods of producing such compensation functions and various means for doing so. These methods follow the broad principles of collecting data on the vibration of the strapdown system environment and then deriving a correction function from this environmental data. Essentially, therefore, the invention consists of partially or fully offsetting R.E. by obtaining correction factors from flight test data and using these factors to compensate the system for R.E.

Because of their economy and simplicity, strapdown guidance systems are especially adopted to inexpensive value-engineered, mass-produced guidance systems, especially for aircraft and missiles. The vibration statistics of aircraft takeoffs and landings, spacecraft booster lift-offs, and many other situations where a strapdown guidance system is used are esesntially identical for all aircraft or missiles of the same type. Therefore correction factors determined from one or more flights of a class of aircraft or missiles will apply equally well to all other flights by missiles or aircraft of the same class. The detailed description to follow teaches applicants' concepts for utilizing this flight test data to provide correction factors which cut out large portions of the R.E. produced in strapdown guidance control loops.

Other features of the invention involve the alternative use of simultaneous parameters or control sources for making R.E. corrections. One such concept is the storage of R.E. correction information which is modulated by the source of R.E. For example, if the R.E. due to a certain power plant in a certain airframe is known, R.E. correction signals may be turned on, turned off, or attenuated based upon the throttle setting of the power plant or upon the power plant output instruments, such as a tachometer or thrust sensor.

Alternatively, vibrations leading to R.E. may be sensed and used to provide instantaneous correction signals (allowing for a slight time lag during processing). Or, as another similar alternative, R.E.-causing occurrences may be sensed, stored, and used to compute periodic correction factors. An example of this latter would be the monitoring and storing of random vibration information during boost vehicle lift-off, then computing one correction signal to compensate for all R.E. occurring up to that time. Once the strapdown guidance system has been so corrected, the vehicle course and location can also be suitably altered.

Other objects and features of this invention and a better understanding thereof may be had by referring to the following description and claims, taken in conjunction with the accompanying drawings in which:

FIG. 1 is a schematic perspective drawing of a strapdown accelerometer system in which the principles of the invention are applied;

FIG. 2 is a block form illustration of the source and creation of one type of R.E. vibropendulous bias;

FIG. 3 is a schematic showing the forces and relations whereby R.E. arises in the accelerometer of FIG. 1;

FIG. 4 illustrates in block form a first class of systems for compensating R.E.;

FIG. 5 illustrates in block form a second class of systems for compensating R.E.; and FIG. 6 shows a mission profile in which course corrections according to the invention are performed.

Referring to FIG. 1, the accelerometer system shown there is one variety of strapdown instrument wherein several varieties of R.E. may arise, because the instrument is tied to solid structure 10. The accelerometer is composed of a pendulum 12 with a mass 14 on its free end. The pendulum 12 is affixed to a rotatable shaft 16, which is usually suspended between position sensor 18 and a torquer 20. In strapdown systems the pendulum 12, the mass 14, the shaft 16, the position sensor 18, and the torquer 20 are all contained within the accelerometer casing which is directly affixed to the solid structure 10 of some aircraft, rocket, or other vehicle as indicated schematically by brackets 22 and 24.

Rotation of the shaft 16 is transduced at 18 into an electrical signal proportional to or otherwise indicative of an angle $\theta$ by which the pendulum 12 is deflected from its null (i.e., zero acceleration) position vector $\overline{P}$ due to an acceleration along the vector $\overline{I}$, which is orthogonal to $\overline{P}$ and to the rotatable shaft 16. Any one accelerometer in a strapdown navigation system measures the acceleration in one direction $\overline{I}$; three accelerometers having their $\overline{I}$ vectors mutually orthogonal can then cover fully all possible components of any acceleration vector arising from acceleration of the structure 10.

Rotation of the shaft 16 as sensed at 18 results in an electrical signal on a line 26 running from the transducer 18 to an amplifier 28. The amplifier 28 drives an increased-strength version of the signal from 18 through a junction 30 both to the torquer 20 and to an output terminal 32 of the accelerometer. The functional block numbered 34 represents the addition to the system of FIG. 1 taught by applicants' present invention, whereby the raw output signal from 18 is corrected for R.E. The same block 34 would appear in a strapdown gyro loop diagram, but the exact R.E. corrections would be different.

As stated above, R.E. results from vibration of a strapdown component and consists of a non-zero product of two vibratory components, when in fact each of the two vibrations has an average value of zero. The specific type of R.E. examined for purposes of illustration herein is vibropendulous R.E., the exact nature of which will be shown below. FIG. 2 illustrates this situation in terms of the accelerometer of FIG. 1. $A_I(t)$ is the $\overline{I}$ axis (input axis) component of a vibration function, usually having more of a random nature than sinusoidal or regular. $A_p(t)$ is the P axis (pendulous axis) component of such a vibration. The two transfer functions at 50 and 52 are the accelerometer system transfer functions, which respond to the vibratory motions $A_I(t)$ and $A_p(t)$, to produce $\theta(t)$ and $A_p(t)$, respectively. These instantaneous signals are multiplied at 54 (in the time domain) to produce an instantaneous product, $X(t)$, which in this case is vibropendulous R.E. If the time average of $X(t)$, denoted $\overline{X}(t)$, is non-zero, the system will exhibit a drift caused by R.E.

To explain vibropendulous R.E. in terms of its observable characteristics, FIG. 3 shows schematically the pendulum 12 and mass 14 when the angle $\theta$ is non-zero, i.e., when the mass 14 is deflected from the null line 15. In any such deflected position, any vibrational force applied in the $\overline{I}$ direction to the mass 14 will cause the mean position of the mass 14 sensed at 16 or sensor 18 to appear some distance from null 15. Although in theory the torquer 20 holds the mass 14 at null even when an acceleration force is applied in the $\overline{I}$ direction, it is impossible to achieve complete null. Thus a subsequent force or motion imposed at 16 in the $\overline{P}$ direction would cause the pendulum 12 to deflect more, when in fact no additional acceleration or force in the $\overline{I}$ direction had occurred. Hereafter, accelerations along the $\overline{I}$ direction will be referred to as $A_I$ components; while accelerations in the $\overline{P}$ direction will be referred to as $A_p$ components.

The same considerations discussed herein relative to vibropendulous R.E. apply also to the other well-known varieties of R.E., such as spin input rectification, spin output rectification, the six forms of sculling, the six forms of coning, and boxing (rectification of two out-of-phase linear inputs).

Applicants' solution of vibropendulous error or any other rectification error problem is the addition of a compensation signal at 34 to the output signal of the system of FIG. 1 (or any other strapdown component system). Thus where any strapdown navigation instrument (gyro, accelerometer) is mounted on the solid structure 10, some electrical means (e.g., the sensor 18) will provide electrical signals indicative of $\theta$ or some other parameter and then the compensation system 34 will alter the electrical signal to cut down the R.E. component therein. Feedback to the torquer 20 may or may not also proceed from 34. Mathematically, the R.E. compensation used at 34 may be determined either in the time domain using the cross correlation function or in the frequency domain using the cross power spectral density function of the random vibration inputs, $f(t)$ and $g(t)$. The cross correlation function is:

$$R_{fg}(\tau) = \lim_{T \to \infty} \frac{1}{2T} \int_{-T}^{T} f(t)g(t+\tau)dt \tag{1}$$

The cross power spectral density function is defined to the Fourier transform of the cross correlation function and may be denoted:

$$\Phi_{fg}(\omega) = \int_{-\infty}^{\infty} R_{fg}(\tau) e^{-i\omega\tau} d\tau \tag{2}$$

Referring again to FIG. 2, in the specific case of vibropendulous R.E. the Laplace transforms of $h(t)$ and $p(t)$ will be $$H(\omega) = \frac{\Theta_p}{A_I}(\omega) \text{ and } P(\omega) = \frac{A_p}{A_p}(\omega) = 1$$

and the cross power spectral density function will be found by applying Eqns. 1 and 2 to $f(t)=$input axis accelerations and $g(t)=$pendulous axis accelerations. The time average can then be derived to be:

$$\overline{X(t)} = \frac{1}{2\Pi} \int_{-\infty}^{\infty} \Phi_{fg}(\omega) H(-\omega) P(\omega) d\omega \tag{3}$$

Similarly, in terms of time domain parameters:

$$h(t) = L^{-1} \left[ \frac{\Theta_p(\omega)}{A_I(\omega)} \right]$$

$$P(t) = L^{-1} \left[ \frac{A_p(\omega)}{A_p(\omega)} \right] = L^{-1}[1] = \delta(t) \tag{4}$$

$$\overline{X}(t) = \int_{-\infty}^{\infty} R_{fg}(\tau) \left[ \int_{l}^{\infty} h(\gamma) p(\gamma - \tau) d\gamma \right] d\tau \tag{5}$$

where
$l = \tau$ for $\tau > 0$
$= 0$ for $\tau < 0$

Not only may $\overline{X}(t)$ be derived by a number of analyses, but also the specific values used in each analysis may be arrived at in several ways. A first method of compensation shown in block form in FIG. 4 adds a correction signal at 100 that has been generated by a function generator 102 based upon values of $\overline{X}$ stored at 104. These values are derived from prior flights of the same airframe or other structure 10 and propulsion system 106 or other vibration source.

If the propulsion system 106 is on for only a portion of a flight or if the power output of the propulsion unit (or any other source of vibration) may be varied by control signals from a source 108, several arrangements for varying the correction signal at 100 may be used. Firstly, changes in vibration power at the source 106 may be sensed directly and fed to the storage means 104, as represented at 110, or the control signals from 108 may be used by the storage means 104, as represented at 112. The 110 or 112 information may be used by the storage means 104 either to switch one stored value of $\overline{X}$ on or off (vis-a-vis the function generator 102), to attenuate $\overline{X}$, or to switch between several stored values of $\overline{X}$, or combinations of the foregoing three alternatives. For example, if the source 108 were the throttle of a jet engine, then the connection 112 would represent the use of the throttle setting to attenuate a stored $\overline{X}$ at 104, while the connection 110 would represent the output either of a tachometer or of direct vibration-sensing instruments at 104. It is worth noting that the value or values of $\overline{X}$ stored at 104 would usually be the composite or over-all $\overline{X}$ for all R.E. caused by the source 106, rather than using one $\overline{X}$ for each type of R.E., such as one for vibropendulous error, etc.

Whereas the system of FIG. 4 featured values of $\overline{X}$ (or other values related to R.E.) which were sensed in prior flights of the same or a similar structure 10—propulsion system 106, the FIG. 5 system features R.E. compensation using information derived in the same flight. $A_I$ components can, of course, be sensed by the accelerometer system 12, 14, 16, 18, and 20, and $A_P$ components can be sensed by one of the other accelerometers in the strapdown guidance system, here represented as a source 120. With $A_I$ and $A_P$, available, $X(t)$ and $\overline{X(t)}$ can be computed at 122, and the values so computed can be used in several ways. $\overline{X(t)}$ can be used by the function generator 102 to make direct and immediate compensation at 100; or $\overline{X(t)}$ can be stored at 124 for a certain period (e.g., the lift-off period of booster), then used by a computer 126 to derive a course correction signal for supply to the guidance and control system 128 of the booster or a subsequent stage to effect a compensatory course correction.

FIG. 6 shows a simplified mission profile in terms of location 140 versus time 142 where an R.E. course correction system (120–122–124–126–128) is used. The solid line 144 is the actual course (including position, attitude, and velocity); the dotted line 146 is the course computed by the strapdown navigation system, i.e., the actual course with information error deviations due to R.E. If boost turn-off is at $t_1$, the point 148 in the actual course 144, the $\overline{X(t)}$ information stored at 124 can be used at $t_2$ to compute an attitude velocity, and position correction 150. Alternately, such a correction 152 can be made at time $t_3$ after booster turn-off, by the next stage after the booster. Also, corrections may be made by the system (120–128) at small time increments, down to the microsecond level, as shown at 154.

Thus, applicants have provided inventive system concepts for minimizing error caused by R.E., essentially by (1) subtracting from a signal subject to R.E. the mean, denoted herein $\overline{X(t)}$ or a value proportional to the mean of the specific R.E. being compensated out, or (2) by computing the instantaneous value of R.E. throughout the flight and substracting this value from the data. This may not eliminate all R.E., but it will undo substantially the ultimate navigational error that uncompensated R.E. creates. Many implementations of this concept may be conceived of, and those few discussed above are only preferred examples which should not limit the scope of protection accorded the basic invention.

We claim:

1. A strapdown navigation system for use on a structure subjected to undesirable vibration, including:
    at least one strapdown navigation instrument mounted on said structure;
    first electrical means associated with said strapdown navigation instrument for providing electrical signals indicative of at least one parameter of said strapdown navigation instrument; and
    second electrical means electrically connected to said first electrical means for providing electrical compensation signals and applying said electrical compensation signals to said electrical signals from said first electrical means whereby said electrical signals from said first electrical means receive compensating corrections for minimizing Rectification Error caused in said strapdown navigation system due to said undesirable vibration.

2. The strapdown navigation system of claim 1 with the addition that a feedback loop is electrically connected between said second electrical means and said strapdown navigation instrument.

3. The strapdown navigation system of claim 1 with the limitation that said second electrical means adds to the electrical signal from said first electrical means a second electrical signal that is proportional to the mean value of said Rectification Error.

4. The strapdown navigation system of claim 1 with the addition that said second electrical means includes storage means and an electrical compensation signal generator electrically connected between said storage and said first electrical means.

5. The strapdown navigation system of claim 4 with the limitation that said storage means provides an electrical signal output means relating to the mean value of said Rectification Error.

6. The strapdown navigation system of claim 5 with the limitation that said electrical signal output means relating to the mean value of said Rectification Error stored by said storage means is signal intelligence derived from test data collected in prior testing of a structure similar to said structure when subjected to vibrations similar to said undesirable vibrations.

7. The strapdown navigation system of claim 6 with the additional specification that said electrical compensation generator utilizes said electrical signal intelligence relating to the mean value of said Rectification Error stored by said storage means to produce an electrical compensation signal which is the inverse of said mean value of said Rectification Error and to add said electrical compensation signal to said electrical signal.

8. The strapdown navigation system of claim 6 with the additional limitation that said electrical signal output means provides electrical signal intelligence indicative of time functions of vibratory motion along three orthogonal axes and also includes time functions of vibratory rotation about three orthogonal axes.

9. The strapdown navigation system of claim 1 with the addition that said second electrical means is electrically connected to add said electrical compensation signals to said electrical signals from said first electrical means and is operatively associated with means responsive to said undesirable vibration in such manner that said second electrical signal is varied to adapt to changes in said undesirable vibration.

10. The strapdown system of claim 1 wherein said means for producing said undesirable vibration includes at least one vehicle propulsion unit having control means and said second electrical means is connected to be controlled by said control means.

11. The strapdown navigation system of claim 7 wherein said undesirable vibration is created by a propulsion unit having varying power levels and the output of said electrical compensation generator varies with the power levels of said propulsion unit.

12. The strapdown navigation system of claim 9 with the addition that said means responsive to said undesirable vibration includes sensor means for sensing said undesirable vibration and computer means for computing the power spectral density of said undesirable vibration.

13. The strapdown guidance system of claim 12 wherein electrical signals indicative of the power spectral density computations made by said computer are coupled from the computer output to said second electrical means to vary said second electrical signal to adapt the strapdown guidance system to changes in said undesirable vibration.

14. A method of partially compensating a strapdown navigation system for Rectification Error arising from unwanted vibrations of the structure on which the components of said strapdown navigation system are mounted, including:
 deriving an electrical output signal indicative of the performance of said strapdown navigation system;
 storing information regarding said unwanted vibrations of the structure on which the components of said strapdown navigation system are mounted;
 utilizing said information regarding said unwanted vibrations to create an electrical compensation signal, and
 adding said electrical compensation signal to said electrical output signal to partially eliminate the Rectification Error component of said electrical output signal.

15. The method of claim 14 wherein the step of utilizing said information includes computing the instantaneous value of the Rectification Error arising from said vibrations and using said instantaneous value to derive the electrical compensation signal.

16. The method of claim 14 wherein the step of storing information includes deriving the information to be stored from prior testing of said strapdown navigation system in a vibration environment similar to that created by said unwanted vibrations.

17. The method of claim 16 wherein the mean value of the Rectification Error arising from said prior testing in said similar vibration environment is stored and used as said electrical compensation signal.

18. The method of claim 14 wherein the step of storing information includes sensing said unwanted vibrations and the step of utilizing said information is performed upon the stored information as quickly as possible after it is sensed.

References Cited

UNITED STATES PATENTS

| | | | |
|---|---|---|---|
| 2,904,681 | 9/1959 | Jones et al. | 328—209 |
| 3,158,339 | 11/1964 | Woodbury et al. | 235—150.25 |
| 3,284,617 | 11/1966 | Lerman | 235—150.25 |
| 3,269,179 | 8/1966 | Anderson | 235—150.25 |

BENJAMIN A. BORCHELT, *Primary Examiner.*

V. R. PENDEGRASS, *Assistant Examiner.*